United States Patent
Thompson et al.

(10) Patent No.: US 10,491,138 B1
(45) Date of Patent: Nov. 26, 2019

(54) MULTILEVEL INVERTERS AND METHODS OF CONTROLLING MULTILEVEL INVERTERS

(71) Applicant: Hamilton Sundstrand Corporation, Charlotte, NC (US)

(72) Inventors: Ernest Thompson, Janesville, WI (US); Adam Michael White, Cherry Valley, IL (US)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 0 days.

(21) Appl. No.: 16/270,068

(22) Filed: Feb. 7, 2019

(51) Int. Cl.
*H02M 7/487* (2007.01)
*H02M 1/08* (2006.01)
*H02M 5/458* (2006.01)
*H02M 7/537* (2006.01)

(52) U.S. Cl.
CPC ............ *H02M 7/487* (2013.01); *H02M 1/08* (2013.01); *H02M 5/4585* (2013.01); *H02M 7/537* (2013.01)

(58) Field of Classification Search
CPC ........ H02M 7/483; H02M 7/487; H02M 7/53; H02M 7/537; H02M 1/08; H02M 5/4585
See application file for complete search history.

(56) References Cited

U.S. PATENT DOCUMENTS

| | | | |
|---|---|---|---|
| 8,625,307 B2 * | 1/2014 | Iwata | ...................... H02M 7/49 363/17 |
| 9,318,974 B2 | 4/2016 | Yoscovich et al. | |
| 9,533,638 B2 | 1/2017 | Karimi et al. | |
| 9,634,579 B2 | 4/2017 | White | |
| 10,003,186 B2 | 6/2018 | Wagner et al. | |
| 2017/0133946 A1 * | 5/2017 | Wagoner | ............. H02M 7/5395 |

* cited by examiner

*Primary Examiner* — Matthew V Nguyen
(74) *Attorney, Agent, or Firm* — Cantor Colburn LLP

(57) ABSTRACT

A method of controlling an inverter includes generating a neutral-phase reference waveform, generating a neutral-phase midpoint compensation waveform using the neutral-phase reference waveform, and generating a neutral-phase compensated duty cycle waveform using the neutral-phase midpoint compensation waveform. Neutral-phase switch command signals are generated for switches of a neutral-phase of the inverter using the neutral-phase compensated duty cycle waveform. Inverters and computer program products are also described.

20 Claims, 6 Drawing Sheets

MULTILEVEL INVERTERS AND METHODS OF CONTROLLING MULTILEVEL INVERTERS

BACKGROUND

The present disclosure relates to electric power conversion, and more particularly to DC power to AC power conversion using multilevel inverters and methods of controlling multilevel inverters to convert DC power into AC power.

Power converters are commonly employed in a variety of applications to convert direct current (DC) power into alternating current (AC) power and vice versa. A converter for AC power to DC power conversion is generally referred to as a rectifier while a converter for DC power to AC power conversion is typically referred to as an inverter. Employment of active components in the converter, such as transistors, allows for regulation of the voltages generated by the converter. Multilevel converter architectures allow for employment of active components with ratings below that of the converter, typically by use of a multilevel DC link.

Multilevel DC links generally include a positive lead, a DC midpoint lead, and negative lead with balancing capacitors connected in series between the DC midpoint lead, positive lead, and negative lead. The DC midpoint voltage is typically maintained at 0 volts DC with respect to ground, allowing connection of the active components to one of the positive and negative leads and the midpoint lead. While this can allow the active components to be rated at one-half the DC link voltage, cycling of the active components typically induces ripple in the DC midpoint voltage. In some applications, such as four (4) wire inverters, large single phase loads or short circuits can induce ripple in the DC midpoint voltage such that upwards of 100% of the DC link voltage is applied to one of the two series connected link capacitors, potentially damaging the link capacitor and/or active components of the converter due to the associated voltage stress.

Such conventional power converters and power conversion methods have generally been considered satisfactory for their intended purpose. However, there is still a need in the art for improved power converters and power conversion methods. The present disclosure provides a solution for this need.

BRIEF DESCRIPTION

A method of controlling an inverter is provided. The method includes generating a neutral-phase reference waveform. A neutral-phase midpoint compensation waveform is generated using the neutral-phase reference waveform. A neutral-phase compensated duty cycle waveform is generated using the neutral-phase midpoint compensation waveform, and neutral-phase switch command signals generated for switches of a neutral-phase of the inverter using the neutral-phase compensated duty cycle waveform.

In addition to one or more of the features described above, or as an alternative, further embodiments may include wherein the inverter has a neutral wire and M-phases, M being greater than or equal to 3.

In addition to one or more of the features described above, or as an alternative, further embodiments may include wherein generating a neutral-phase reference waveform comprises generating phase reference waveforms for each phase of the inverter.

In addition to one or more of the features described above, or as an alternative, further embodiments may include wherein generating a neutral-phase reference waveform comprises generating the neutral-phase reference waveform using a pulse-density modulation technique.

In addition to one or more of the features described above, or as an alternative, further embodiments may include wherein generating a neutral-phase midpoint compensation waveform comprises generating a phase midpoint compensation waveform for each phase of the inverter.

In addition to one or more of the features described above, or as an alternative, further embodiments may include wherein generating a neutral-phase compensated duty cycle waveform comprises generating a phase compensated duty cycle waveform for each phase of the inverter.

In addition to one or more of the features described above, or as an alternative, further embodiments may include wherein generating a neutral-phase compensated duty cycle waveform comprises generating a phase compensated duty cycle waveform for each phase of the inverter.

In addition to one or more of the features described above, or as an alternative, further embodiments may include wherein generating a neutral-phase compensated duty cycle waveform comprises subtracting one-half the neutral-phase reference waveform from a minimum of 0 and the neutral-phase reference waveform.

In addition to one or more of the features described above, or as an alternative, further embodiments may include wherein generating a neutral-phase compensated duty cycle waveform comprises adding one-half the neutral-phase reference waveform to a maximum of 0 and the neutral-phase reference waveform.

In addition to one or more of the features described above, or as an alternative, further embodiments may include wherein generating neutral-phase switch command signals for switches of a neutral-phase of the inverter comprises generating phase switch command signals for switches of each phase of the inverter using a phase compensated duty cycle waveform for each phase of the inverter.

In addition to one or more of the features described above, or as an alternative, further embodiments may include connecting each phase of the inverter to a midpoint rail for equivalent periods of time during switching cycles of the inverter.

In addition to one or more of the features described above, or as an alternative, further embodiments may include receiving direct current (DC) at the inverter, and inverting the DC power into alternating current (AC) power using the neutral-phase switch command signals.

A multilevel inverter is also provided. The inverter includes a neutral-phase with a plurality of switches, a direct current (DC) midpoint rail connected to the switches, and controller. The controller is operatively connected to the plurality of switches and disposed in communication with a memory having instructions recorded thereon that, when read by the controller, cause the controller to (a) generate a neutral-phase reference waveform, (b) generate a neutral-phase midpoint compensation waveform using the neutral-phase reference waveform, (c) generate a neutral-phase compensated duty cycle waveform using the neutral-phase midpoint compensation waveform, and (d) generate neutral-phase switch command signals for switches of a neutral-phase of the inverter using the neutral-phase compensated duty cycle waveform.

In addition to one or more of the features described above, or as an alternative, further embodiments may include wherein the inverter has a neutral wire and M-phases, M being greater than or equal to 3, and wherein the instructions further cause the controller to generate phase reference waveforms for each phase of the inverter, generate a phase midpoint compensation waveform for each phase of the inverter using the phase reference waveforms, generate a phase compensated duty cycle waveform for each phase of the inverter using the phase midpoint compensation waveforms, and generate phase switch command signals for switches of each phase of the inverter using a phase compensated duty cycle waveform for each phase of the inverter.

In addition to one or more of the features described above, or as an alternative, further embodiments may include wherein the inverter has a neutral wire and M-phases, M being greater than or equal to 3, and wherein the instructions further cause the controller to connect each phase of the inverter to a midpoint rail for equivalent periods of time during switching cycles of the inverter phases.

In addition to one or more of the features described above, or as an alternative, further embodiments may include a multilevel DC link connected to the inverter.

In addition to one or more of the features described above, or as an alternative, further embodiments may include a rectifier connected to the inverter.

In addition to one or more of the features described above, or as an alternative, further embodiments may include a variable frequency AC power source connected to the inverter by the rectifier.

In addition to one or more of the features described above, or as an alternative, further embodiments may include an AC bus connected to the inverter, the AC bus comprising an A-phase lead, a B-phase lead, a C-phase lead, and a neutral-phase lead.

A computer program product is additionally provided. The computer program product is tangibly embodied on a computer readable medium and includes instructions that, when read by a processor, cause the processor to perform operations including (a) generating a neutral-phase reference waveform, (b) generating a neutral-phase midpoint compensation waveform using the neutral-phase reference waveform, (c) generating a neutral-phase compensated duty cycle waveform using the neutral-phase midpoint compensation waveform, and (d) generating neutral-phase switch command signals for switches of a neutral-phase of the inverter using the neutral-phase compensated duty cycle waveform.

In addition to one or more of the features described above, or as an alternative, further embodiments may include connecting each phase of the inverter to a midpoint rail for equivalent periods of time during switching cycles of the inverter phases.

Technical effects of embodiments of the present disclosure include reduction (and/or eliminate entirely) of DC midpoint voltage ripple in multilevel inverters. The present disclosure can also limit (or eliminate entirely) DC midpoint voltage imbalance associated with unbalanced load conditions, large single phase loads and/or short circuits in electrical systems with multilevel inverters.

The foregoing features and elements may be combined in various combinations without exclusivity, unless expressly indicated otherwise. These features and elements as well as the operation thereof will become more apparent in light of the following description and the accompanying drawings. It should be understood, however, that the following description and drawings are intended to be illustrative and explanatory in nature and non-limiting.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1:
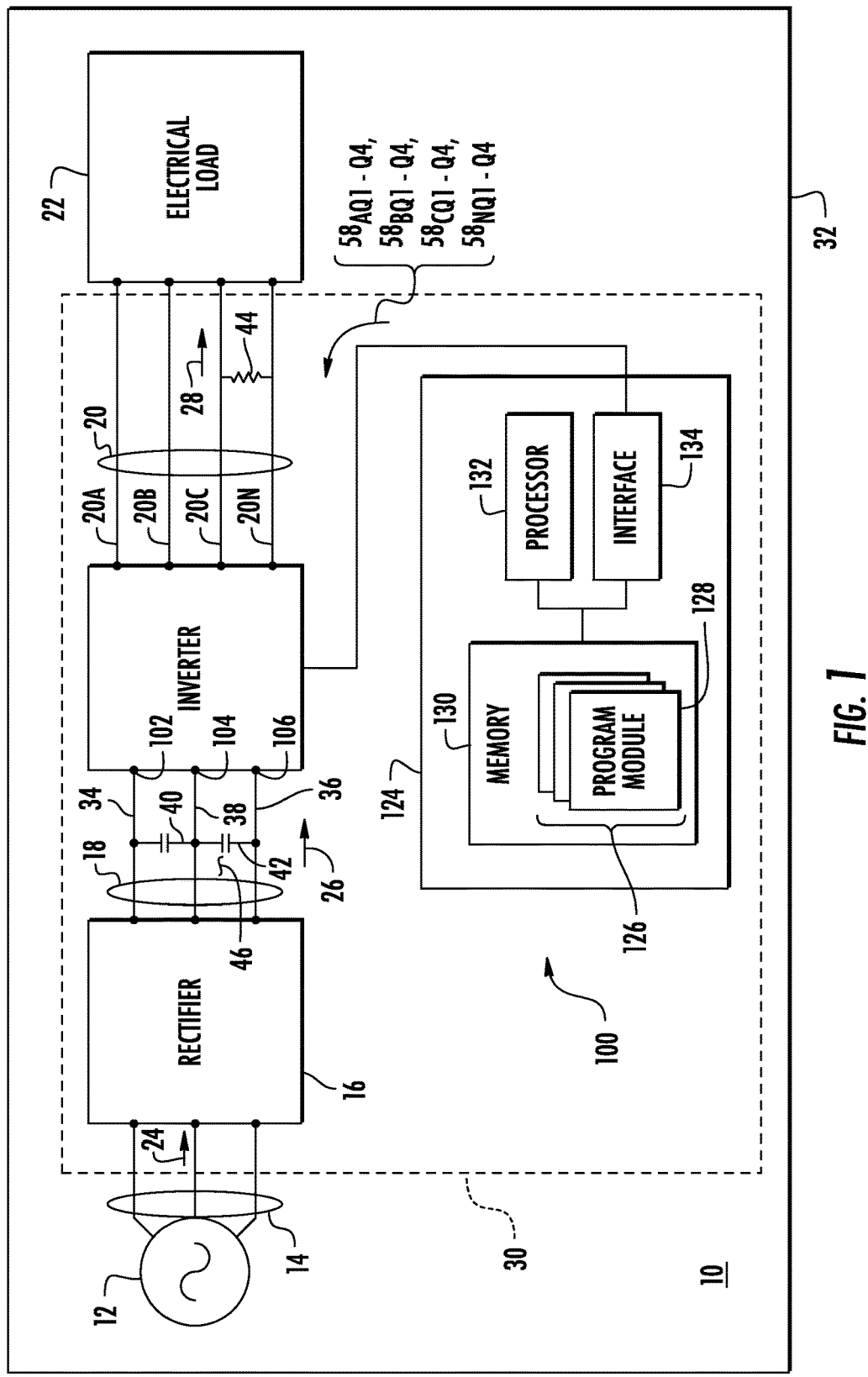
FIG. 1 is a schematic diagram of a power converter constructed in accordance with the present disclosure, showing a power converter converting variable frequency alternating current (AC) power into multi-phase constant frequency AC power using switch command signals generated by a controller operatively connected to an inverter.

Reference will now be made to the drawings wherein like reference numerals identify similar structural features or aspects of the subject disclosure. For purposes of explanation and illustration, and not limitation, a partial view of an exemplary embodiment of an inverter in accordance with the disclosure is shown in FIG. 1 and is designated generally by reference character 100. Other embodiments of inverters, methods of controlling inverters, and computer program products in accordance with the disclosure, or aspects thereof, are provided in FIGS. 2-6, as will be described. The systems and methods described herein can be used for power converters having inverters, such as inverters having neutral-phases for variable speed constant frequency (VSCF) power converters in aircraft electrical systems, though the present disclosure is not limited to VSCF power converters or to aircraft electrical systems in general.

Referring now to FIG. 1, power distribution system 10 is shown. Power distribution system 10 includes an alternating current (AC) power source 12, an AC feeder 14, and a rectifier 16. The power distribution system 10 also includes a direct current (DC) link 18, the inverter 100, an AC bus 20, and an electrical load 22.

The AC power source 12 is connected to the rectifier 16 by the AC feeder 14 and is arranged to provide AC power 24 to the rectifier 16 through the AC feeder 14. The rectifier 16 is connected to the inverter 100 by the DC link 18 and is arranged to provide DC power 26 to the inverter 100 through the DC link 18. The inverter 100 is in turn connected to the electrical load 22 by the AC bus 20 and is arranged to invert the DC power 26 into AC power 28, which the AC bus 20 provides to the electrical load 22. In certain embodiments the rectifier 16, the DC link 18, and the inverter 100 are arranged back-to-back to form a VSCF power converter 30, the AC power source 12 providing variable frequency AC power 24 to the rectifier 16 and the inverter 100 providing constant frequency AC power to the electrical load 22. It is contemplated that the power distribution system 10 be carried by an aircraft 32, though it is to be understood and appreciated that the present disclosure is not limited to aircraft electrical systems or to vehicular electrical systems in general.

As shown and described herein the power distribution system 10 is a four (4) wire, 3-phase power distribution system. In this respect the AC bus 20 includes an A-phase lead 20A, a B-phase lead 20B, a C-phase lead 20C, and a neutral lead 20N, each of which are connected to the inverter 100 and at least two of which including the neutral lead 20N connect the electrical load 22 to the inverter 100. In certain embodiments the inverter 100 is a multilevel inverter 100 having a positive rail 102, a midpoint rail 104, and a negative rail 106. The DC link 18 is connected to the rails of the inverter 100, the DC link having a positive lead 34, a negative lead 36, and a midpoint lead 38 interconnected to one another by a serially connected first balancing capacitor 40 and a second balancing capacitor 42.

Figure 2:
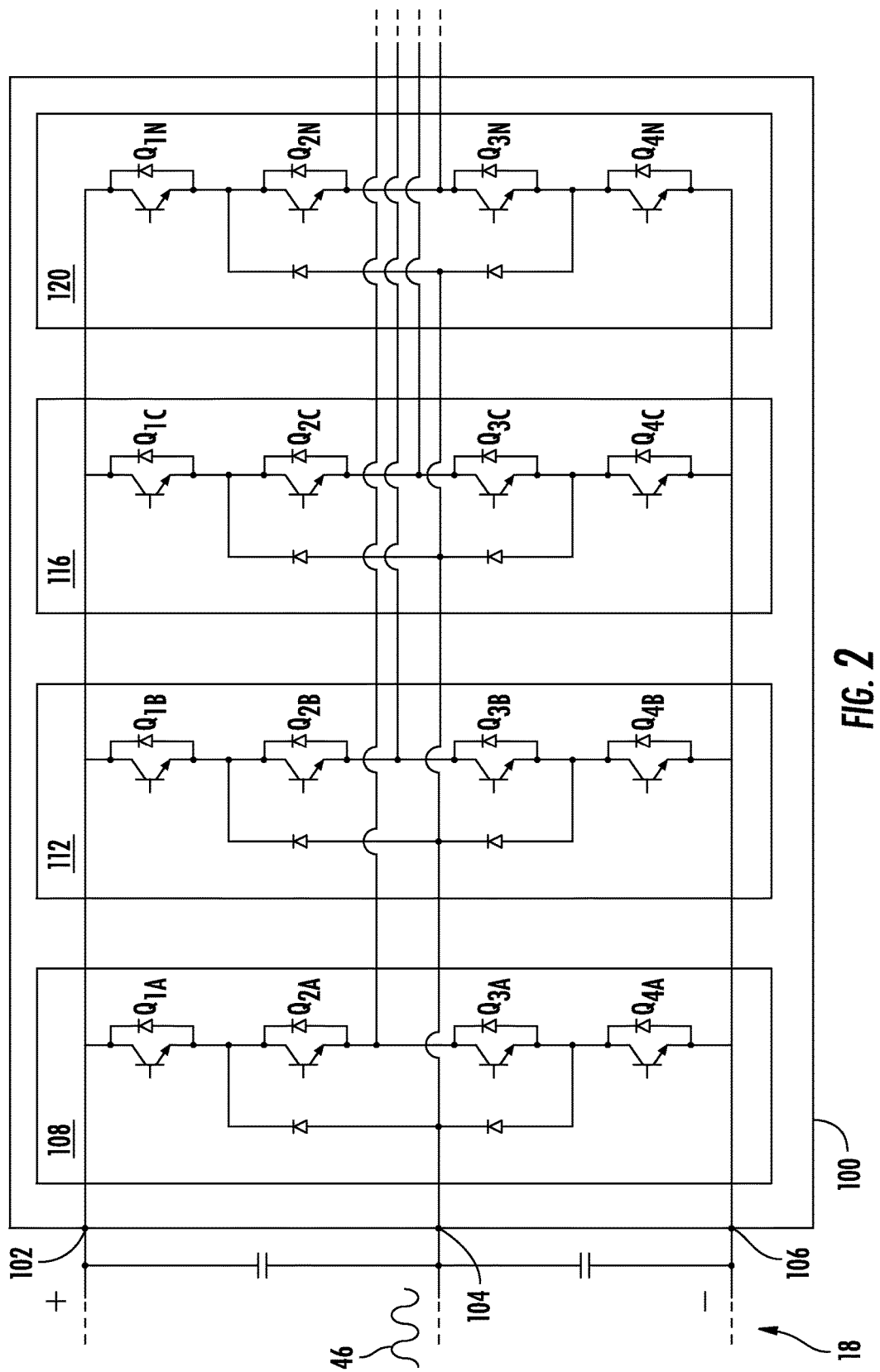
FIG. 2 is a circuit diagram of the inverter of FIG. 1, showing switches of the inverter A-phase, the inverter B-phase, the inverter C-phase, and the inverter neutral-phase.

With reference to FIG. 2, the positive rail 102, the midpoint rail 104, and the negative rail 106 connect the DC link 18 to four phases of the inverter 100. In this respect the inverter 100 includes an A-phase 108 having a four A-phase switches $Q_{1A-4A}$, a B-phase 112 having four B-phase switches $Q_{1B-4B}$, a C-phase 116 having four C-phase switches $Q_{1C-4C}$, and a neutral-phase having four switches $Q_{1N-4N}$. In certain embodiments the inverter 100 operates as shown and described in U.S. Pat. No. 9,634,579 B2, issued on Apr. 27, 2017, the contents of which are incorporated herein by reference in its entirety, the inverter 100 additionally having a neutral-phase 120 with a plurality of neutral-phase switches 122. Although shown and described herein as a four (4) wire 3-phase inverter 100 it is to be understood and appreciated that the present disclosure can also benefit inverters having more than 3-levels, as suitable for an intended application.

As will be appreciated by those of skill in the art in view of the present disclosure, electrical load imbalance and/or short circuits in some power distribution systems can sometimes introduce ripple in the DC link providing DC power to an inverter. Specifically, the electrical load imbalance and/or short circuits can cause ripple in the potential applied by the DC midpoint lead in a multilevel system. This is illustrated in schematically in FIG. 1 with a load imbalance/short circuit 44 connected between the C-phase lead 20C and the neutral lead 20N, resulting in DC midpoint voltage ripple 46.

As will also be appreciated by those of skill in the art in view of the present disclosure, DC midpoint voltage ripple in some power distribution systems can be such that upwards of 100% of the intended potential difference between the positive lead and the negative lead of the multilevel DC bus is applied across one of the balancing capacitors, potentially exceeding the device rating and/or exerting overvoltage stress on the device sufficient to reduce the reliability of the power distribution system. To limit (or eliminate entirely) the DC midpoint voltage ripple 46 when the electrical load imbalance and/or short circuit 44 (shown in FIG. 1) is present, the inverter 100 includes a computer program product 126 (shown in FIG. 1) configured to generate compensated switch signal commands to limit (or eliminate entirely) the DC midpoint voltage ripple 46. It is contemplated that the computer program product 126 be implemented in a controller 124 (shown in FIG. 1) operatively connected to the inverter 100.

With continuing reference to FIG. 1, the controller 124 includes a processor 132, an interface 134, and a memory 130. The interface 134 is disposed in communication with the inverter 100 for providing switch commands to the switches of the inverter phases, e.g., to provide switch command signals $58_{AQ1-Q4}$ to the inverter A-phase 108 (shown in FIG. 2), provide switch command signals $58_{BQ1-Q4}$ to the inverter B-phase 112 (shown in FIG. 2), provide switch command signals $58_{CQ1-Q4}$ to the inverter C-phase 116 (shown in FIG. 2), and provide switch command signals $58_{NQ1-Q4}$ to the inverter neutral-phase 120. The processor 132 is disposed in communication with the interface 134 and the memory 130. The memory 130 has a plurality of program modules 128 recorded on it with instructions that, when read by the processor 132, cause the processor 132 to control the inverter 100 according to a method 200 (shown in FIG. 6) to limit (or eliminate entirely) the DC midpoint voltage ripple 46 (shown in FIG. 2), as will be described.

Figure 3:
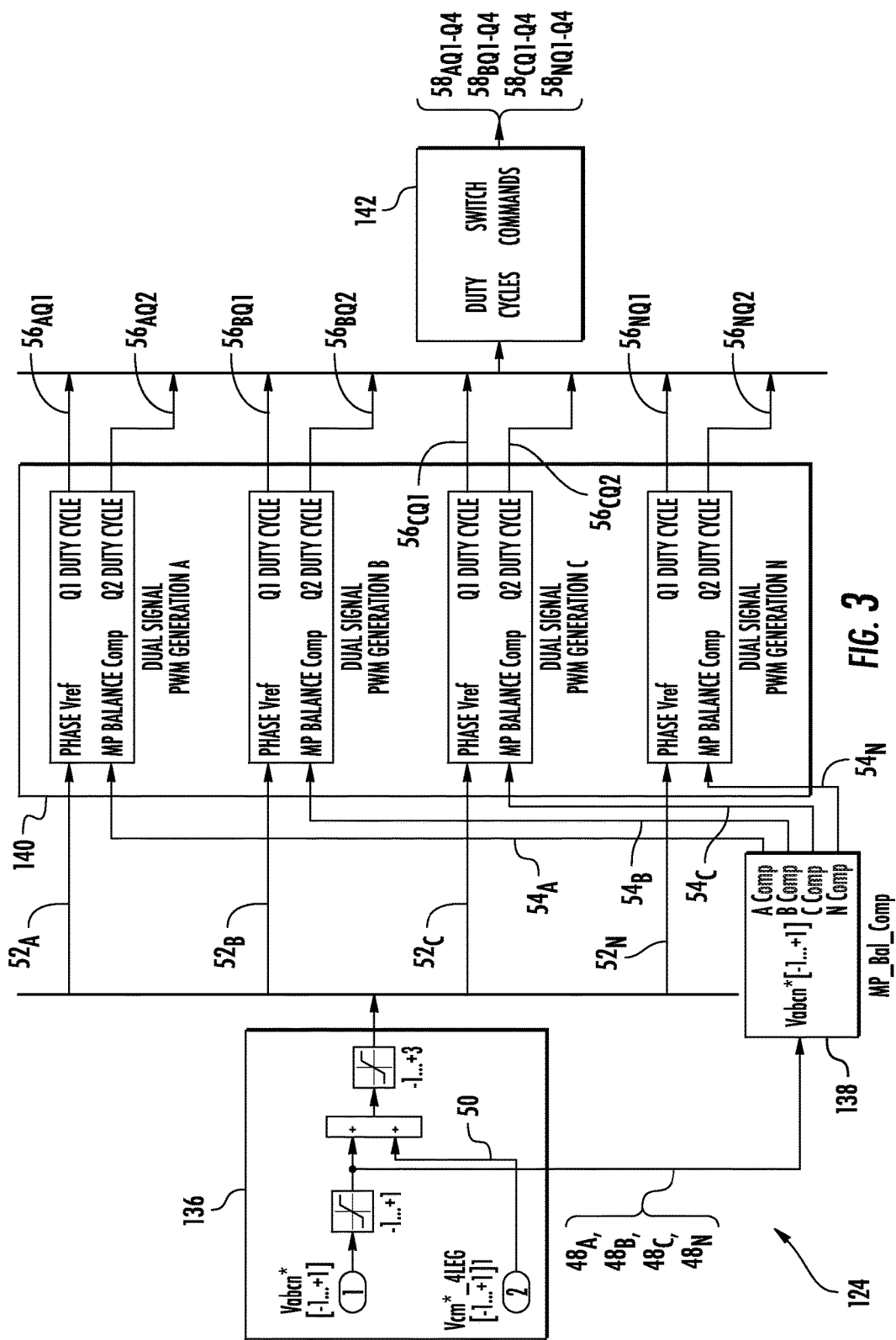
FIG. 3 is a block diagram of the controller of the power converter of FIG. 1, showing a reference waveform block disposed in communication with a switching signal block through a midpoint compensation waveform block and a duty cycle waveform block.

With reference to FIG. 3, controller 124 is shown with a logic diagram. The controller 124 includes a reference waveform block 136, a midpoint compensation waveform block 138, a duty cycle waveform block 140, and switching signal block 142. The reference waveform block 136 is disposed in communication with the midpoint compensation waveform block 138 and is arranged to provide to the midpoint compensation waveform block 138 phase reference waveforms, e.g., an A-phase reference waveform $48_A$, a B-phase reference waveform $48_B$, a C-phase reference waveform $48_C$, and a neutral-phase reference waveform $48_N$. The reference waveform block 136 is also disposed in communication with the duty cycle waveform block 140 and is configured to provide to the duty cycle waveform block 140 common mode-adjusted phase reference waveforms, e.g., a common mode-adjusted A-phase reference waveform $52_A$, a common mode-adjusted B-phase reference waveform $52_B$, a common mode-adjusted C-phase reference waveform $52_C$, and a common mode-adjusted neutral-phase reference waveform $52_N$.

Figure 4:
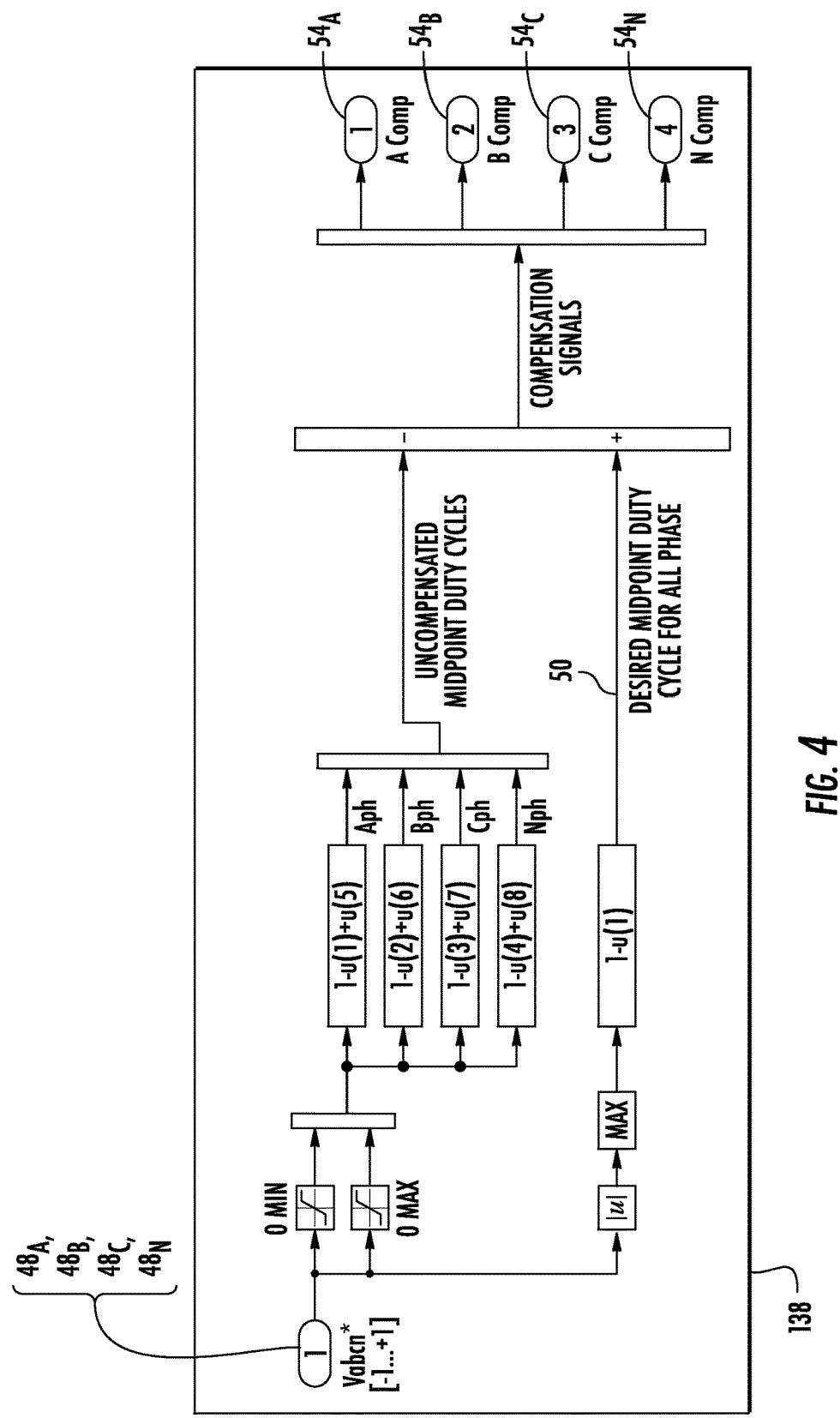
FIG. 4 is a logic diagram of the midpoint compensation waveform block of the controller of FIG. 1, showing operations to generate phase compensation waveform for each phase of the inverter using phase reference waveforms for each phase of the inverter input to the midpoint compensation waveform block.

Referring to FIG. 4, the midpoint compensation waveform block 138 of controller 124 is shown. The midpoint compensation waveform block 138 is disposed in communication with the duty cycle generator block 140 and is configured to provide to the duty cycle waveform block 140 a midpoint compensation waveform for each of the phases of the inverter 100. In this respect the midpoint compensation waveform block 138 generates each of an A-phase midpoint compensation waveform $54_A$, a B-phase midpoint compensation waveform $54_B$, a C-phase midpoint compensation waveform $54_C$, and a neutral-phase midpoint compensation waveform $54_N$. Notably, the generation of the neutral-phase midpoint compensation waveform $54_N$ allows the DC midpoint voltage ripple 46 (shown in FIG. 2) to be decreased further than possible with compensation of the inverter A-phase 108 (shown in FIG. 2), the inverter B-phase 112 (shown in FIG. 2), and the inverter C-phase 116 (shown in FIG. 2).

Figure 5:
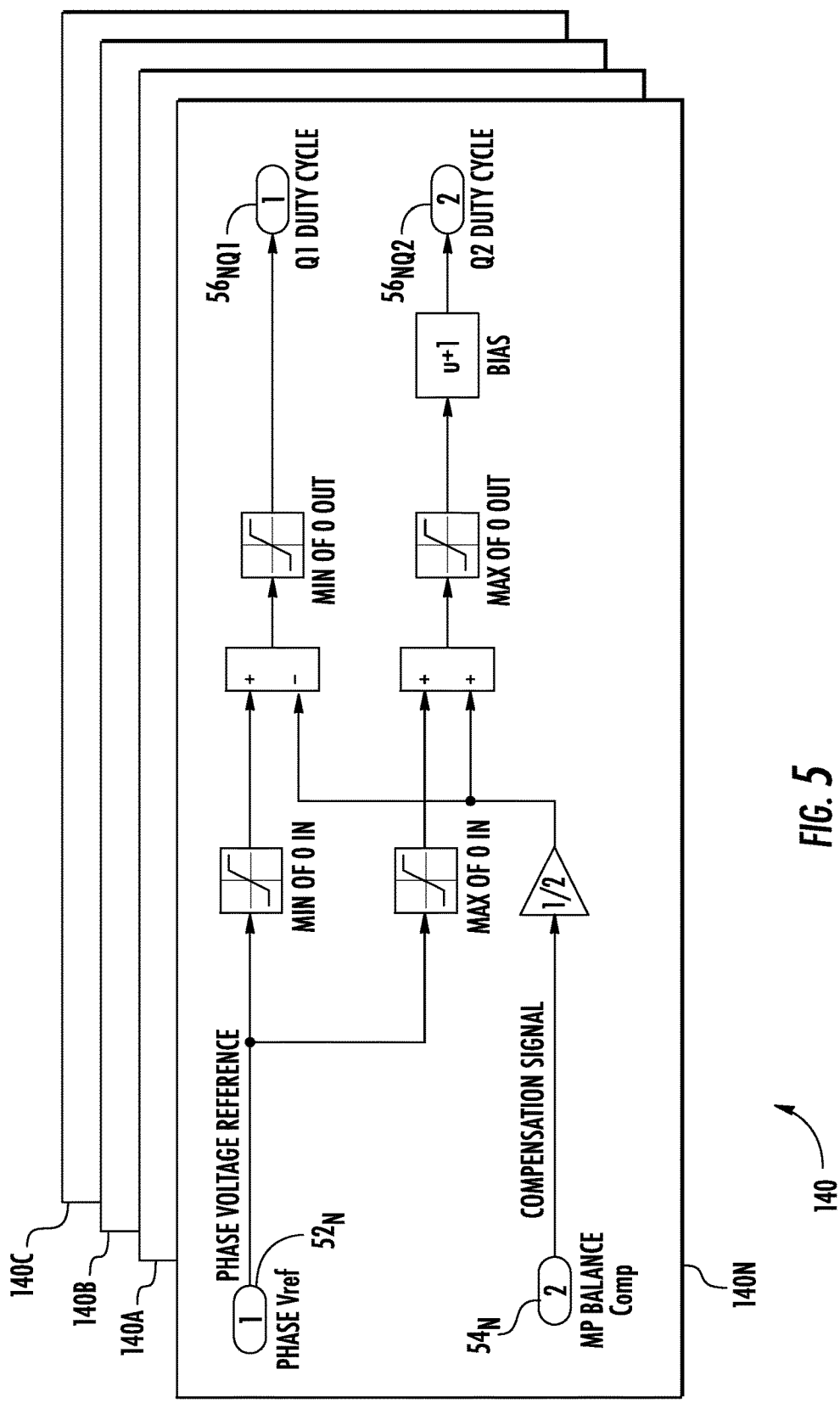
FIG. 5 is a logic diagram of the duty cycle waveform block of the controller of FIG. 1, showing operations to generate compensated phase duty cycle waveforms for each of the inverter phases using common mode-adjusted waveforms and phase midpoint compensation waveforms for each of the inverter phases.

Referring to FIG. 5, the duty cycle waveform block 140 is disposed in communication with reference waveform block 136 (shown in FIG. 3) and the midpoint compensation waveform block 138 (shown in FIG. 3). Using the common mode-adjusted phase reference waveforms $52_{A-N}$ received from the reference waveform block 136 and the phase midpoint compensation waveforms $54_{A-N}$ received from the midpoint compensation waveform block 138, the duty cycle waveform block 140 generates first and second compensated phase duty cycle waveforms, e.g. first compensated duty cycle waveforms $56_{A\text{-}NQ1}$ and second compensated duty cycle waveforms $56_{A\text{-}NQ2}$. In this respect the duty cycle waveform block 140 generates a first compensated A-phase duty cycle waveform $56_{AQ1}$ and a second compensated A-phase duty cycle waveform $56_{AQ2}$, a second compensated B-phase duty cycle waveform $56_{BQ1}$ and a second compensated B-phase duty cycle waveform $56_{BQ2}$, a first compensated C-phase duty cycle waveform $56_{CQ1}$ and a second compensated C-phase duty cycle waveform $56_{CQ2}$, and a first compensated neutral-phase duty cycle waveform $56_{NQ1}$ and a second compensated neutral-phase duty cycle waveform $56_{NQ2}$, which are provided to the switching signal block 142 (shown in FIG. 3).

The switching signal block 142 in turn generates the switch command signals, e.g., the switch command signals $58_{AQ1\text{-}Q4}$ (shown in FIG. 1), switch command signals $58_{BQ1\text{-}Q4}$ (shown in FIG. 1), the switch command signals $58_{CQ1\text{-}Q4}$ (shown in FIG. 1), and the switch command signals $58_{NQ1\text{-}Q4}$ (shown in FIG. 1), which are provided to the inverter 100 for inverter the DC power 26 (shown in FIG. 1) into AC power 28 (shown in FIG. 1) while limiting (or eliminating entirely) DC midpoint voltage ripple 46 (shown in FIG. 2).

Figure 6:
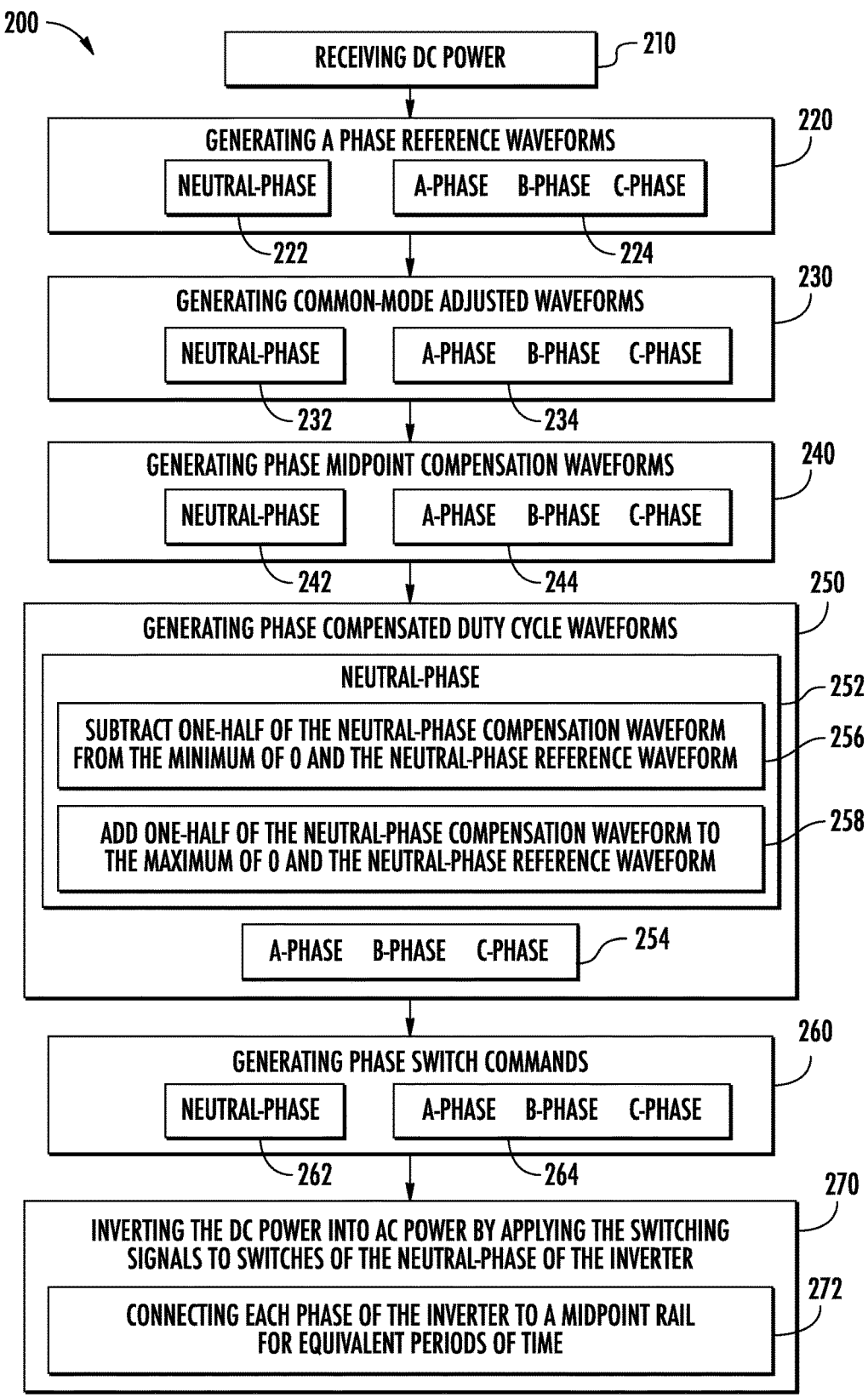
FIG. 6 is a flow chart of a method controlling an inverter, showing steps of the method.

With reference to FIG. 6, the method 200 of controlling an inverter, e.g., the inverter 100 (shown in FIG. 1), is shown. As shown in box 210, the method 200 includes receiving DC power at an inverter, e.g., the DC power 26 (shown in FIG. 1) at the inverter 100 (shown in FIG. 1). The DC power is inverted into AC power, e.g., the AC power 28 (shown in FIG. 1) by applying switching signals to switches of each phase of the inverter, e.g., switch command signals $58_{AQ1\text{-}Q4}$ (shown in FIG. 1) to the inverter A-phase 108 (shown in FIG. 2), switch command signals $58_{BQ1\text{-}Q4}$ (shown in FIG. 1) to the inverter B-phase 112 (shown in FIG. 2), switch command signals $58_{CQ1\text{-}Q4}$ (shown in FIG. 1) to the inverter C-phase 116 (shown in FIG. 2), and switch command signals $58_{NQ1\text{-}Q4}$ (shown in FIG. 1) to the inverter neutral-phase 120 (shown in FIG. 2), as shown with box 270. It is contemplated that the switching signals be generated according the operations shown in boxes 220-250, as will be described, and that the switching signals cause each phase of the inverter to connect to the DC midpoint, e.g., via the inverter midpoint rail 104 (shown in FIG. 1), for equivalent time intervals during conversion, as shown with box 272.

As shown with box 220, phase reference waveforms are generated for the inverter. In this respect a neutral-phase waveform is generated for the inverter neutral-phase, e.g., the neutral-phase reference waveform $48_N$, as shown with box 222. It is contemplated that a separate phase reference waveform be additionally generated for each phase of the inverter, e.g., an A-phase reference waveform $48_A$ (shown in FIG. 3) for the inverter A-phase 108 (shown in FIG. 2), a B-phase reference waveform $48_B$ (shown in FIG. 3) for the inverter B-phase 112 (shown in FIG. 2), and a C-phase reference waveform $48_C$ (shown in FIG. 3) for the inverter C-phase 116 (shown in FIG. 2), as shown with box 224.

As shown with box 230, common mode-adjusted phase reference waveforms are generated using the separate phase reference waveforms and a common mode waveform, e.g., common mode waveform 50 (shown in FIG. 3). In this respect a common mode-adjusted neutral-phase waveform is generated using the common mode waveform, e.g., a common mode-adjusted neutral-phase waveform $52_N$ (shown in FIG. 3), as shown with box 232. It is contemplated that a common mode-adjusted phase reference waveform additionally be generated for each inverter phase, e.g., a common mode-adjusted A-phase reference waveform $52_A$ (shown in FIG. 3) for the inverter A-phase 108 (shown in FIG. 2), a common mode-adjusted B-phase reference waveform $52_B$ (shown in FIG. 3) for the inverter B-phase 112 (shown in FIG. 2), and a common mode-adjusted C-phase reference waveform $52_C$ (shown in FIG. 3) for the inverter C-phase 116 (shown in FIG. 2), as shown with box 234. As shown in reference waveform block 136 of FIG. 3, the common mode-adjusted waveform for each inverter phase can be generated by adding the common mode waveform 50 to each the phase reference waveforms.

As shown with box 240, phase midpoint compensation waveforms are generated for the inverter phases using the phase reference waveforms. In this respect a neutral-phase midpoint compensation waveform is generated for the neutral-phase of the inverter, e.g., a neutral-phase midpoint compensation waveform $54_N$ (shown in FIG. 3) for inverter neutral-phase 120 (shown in FIG. 2), as shown with box 242. In certain embodiments phase midpoint compensation waveforms are additionally generated for each phase of the inverter including the inverter neutral-phase, e.g., an A-phase midpoint compensation waveform $54_A$ (shown in FIG. 3) for the inverter A-phase 108 (shown in FIG. 2), a B-phase midpoint compensation waveform $54_B$ (shown in FIG. 3) generated for the inverter B-phase 112 (shown in FIG. 2), and a C-phase midpoint compensation waveform $54_C$ (shown in FIG. 3) generated for the inverter C-phase 116 (shown in FIG. 2), as shown with box 244. The phase midpoint compensation waveforms can be calculated according to the logic shown in FIG. 4.

As shown with box 250, the phase compensated duty cycle waveforms are generated using both the phase reference waveform and the phase midpoint compensation waveform for the respective inverter phase. In this respect first and second neutral-phase compensated duty cycle waveforms are generated using the neutral-phase reference waveform and the neutral-phase midpoint compensation waveform, e.g., a first neutral-phase compensated duty cycle waveforms $56_{NQ1}$ (shown in FIG. 3) and a second neutral-phase compensated duty cycle waveform $56_{NQ2}$ (shown in FIG. 3) are generated using the common mode-adjusted neutral-phase reference waveform $52_N$ (shown in FIG. 3) and the neutral-phase midpoint compensation waveform $54_N$ (shown in FIG. 3), as shown with box 252.

In certain embodiments phase compensated duty cycle waveforms are additionally generated for each phase of the inverter. For example, a first A-phase compensated duty cycle waveforms $56_{AQ1}$ (shown in FIG. 3) and a second A-phase compensated duty cycle waveform $56_{AQ2}$ (shown in FIG. 3) are generated using the common mode-adjusted A-phase reference waveform $52_A$ (shown in FIG. 3) and the A-phase midpoint compensation waveform $54_A$ (shown in FIG. 3). A first B-phase compensated duty cycle waveforms $56_{BQ1}$ (shown in FIG. 3) and a second B-phase compensated duty cycle waveform $56_{BQ2}$ (shown in FIG. 3) are generated using the common mode-adjusted B-phase reference waveform $52_B$ (shown in FIG. 3) and the B-phase midpoint compensation waveform $54_B$ (shown in FIG. 3). A first C-phase compensated duty cycle waveforms $56_{CQ1}$ (shown in FIG. 3) and a second C-phase compensated duty cycle waveform $56_{CQ2}$ (shown in FIG. 3) are generated using the common mode-adjusted C-phase reference waveform $52_C$ (shown in FIG. 3) and the C-phase midpoint compensation waveform $54_C$ (shown in FIG. 3).

It is contemplated that the first neutral-phase compensated duty cycle waveform $56_{NQ1}$ can be generated by subtracting one-half the neutral-phase midpoint compensation waveform $54_N$ from the minimum of 0 and the common mode-adjusted neutral-phase reference waveform $52_N$ during the waveform period, as shown by box 256. It is also contemplated that the second neutral-phase compensated duty cycle waveform $56_{NQ2}$ can be generated by adding one-half the neutral-phase midpoint compensation waveform $54_N$ from the maximum of 0 and the common mode-adjusted neutral-phase reference waveform $52_N$ during the waveform period, as shown by 258.

In certain embodiments first compensated duty cycle waveforms and second duty cycle compensated waveforms are calculated for the inverter A-phase 108 (shown in FIG. 2), the inverter B-phase 112 (shown in FIG. 2), and the inverter C-phase 116 (shown in FIG. 2), as shown by box 254. In this respect the first A-phase compensated duty cycle waveform $56_{AQ1}$ can be generated by subtracting one-half the A-phase midpoint compensation waveform $54_A$ from the minimum of 0 and the common mode-adjusted A-phase reference waveform $52_A$ during the waveform period, and the second A-phase compensated duty cycle waveform $56_{AQ2}$ can be generated by adding one-half the A-phase midpoint compensation waveform $54_A$ from the maximum of 0 and the common mode-adjusted A-phase reference waveform $52_A$ during the waveform period. Further, the first B-phase compensated duty cycle waveform $56_{BQ1}$ can be generated by subtracting one-half the B-phase midpoint compensation waveform $54_B$ from the minimum of 0 and the B-phase common mode-adjusted reference waveform $52_B$ during the waveform period, and the second B-phase compensated duty cycle waveform $56_{BQ2}$ can be generated by adding one-half the B-phase midpoint compensation waveform $54_B$ from the maximum of 0 and the common mode-adjusted B-phase reference waveform $52_B$ during the waveform period. In addition, the first C-phase compensated duty cycle waveform $56_{CQ1}$ can be generated by subtracting one-half the C-phase midpoint compensation waveform $54_C$ from the minimum of 0 and the common mode-adjusted C-phase reference waveform $52_C$ during the waveform period, and the second C-phase compensated duty cycle waveform $56_{CQ2}$ can be generated by adding one-half the C-phase midpoint compensation waveform $54_C$ from the maximum of 0 and the common mode-adjusted C-phase reference waveform $52_C$ during the waveform period.

As shown with box 260, the phase switching commands are generated for each of the phases using the phase compensated duty cycle waveforms for the inverter phase. In this respect neutral-phase switch command signals $58_{NQ1-Q4}$ (shown in FIG. 2) are generated for the switches of the inverter neutral-phase 120 using the neutral-phase compensated duty cycle waveform $56_{NQ1}$ (shown in FIG. 3) and the neutral-phase compensated duty cycle waveform $56_{NQ2}$ (shown in FIG. 3), as shown with box 262. In certain embodiments A-phase switch command signals $58_{AQ1-Q4}$ (shown in FIG. 1) are additionally generated for the switches of the inverter A-phase 108 (shown in FIG. 2) using the A-phase compensated duty cycle waveform $56_{AQ1}$ (shown in FIG. 3) and the A-phase compensated duty cycle waveform $56_{AQ2}$ (shown in FIG. 3), B-phase switch command signals $58_{BQ1-Q4}$ (shown in FIG. 1) are generated for the switches of the inverter B-phase 112 (shown in FIG. 2) using the B-phase compensated duty cycle waveform $56_{BQ1}$ (shown in FIG. 3) and the neutral-phase compensated duty cycle waveform $56_{BQ2}$ (shown in FIG. 3), and C-phase switch command signals $58_{CQ1-Q4}$ (shown in FIG. 1) are generated for the switches of the inverter C-phase 116 (shown in FIG. 2) using the C-phase compensated duty cycle waveform $56_{CQ1}$ (shown in FIG. 3) and the C-phase compensated duty cycle waveform $56_{CQ2}$ (shown in FIG. 3) as shown with box 264. The switching signals can be generated, for example, by converting the compensated phase duty cycle waveform for the respective inverter phase into binary (on/off) switch command signals using pulse width modulation.

The methods and systems of the present disclosure, as described above and shown in the drawings, provide for power converters with superior properties including reduced (or eliminated) DC midpoint lead current and controlled common mode voltage on the AC output leads. While the apparatus and methods of the subject disclosure have been shown and described with reference to preferred embodiments, those skilled in the art will readily appreciate that changes and/or modifications may be made thereto without departing from the scope of the subject disclosure.

As described above, embodiments, such as the computer program product 126 (shown in FIG. 1) embodying the method 200 (shown in FIG. 6), can be in the form of processor-implemented processes and devices for practicing those processes, such as a processor. Embodiments can also be in the form of computer program code containing instructions embodied in tangible media, such as network cloud storage, SD cards, flash drives, floppy diskettes, CD ROMs, hard drives, EEPROM, flash memory, or any other computer-readable storage medium, wherein, when the computer program code is loaded into and executed by a computer, the computer becomes a device for practicing the embodiments. Embodiments can also be in the form of computer program code, for example, whether stored in a storage medium, loaded into and/or executed by a computer, or transmitted over some transmission medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes a device for practicing the embodiments. When implemented on a general-purpose microprocessor, the computer program code segments configure the microprocessor to create specific logic circuits.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodi-

What is claimed is:

1. A method of controlling an inverter, comprising:
generating a neutral-phase reference waveform;
generating a neutral-phase midpoint compensation waveform using the neutral-phase reference waveform;
generating a neutral-phase compensated duty cycle waveform using the neutral-phase midpoint compensation waveform; and
generating neutral-phase switch command signals for switches of a neutral-phase of the inverter using the neutral-phase compensated duty cycle waveform.

2. The method as recited in claim 1, wherein the inverter has a neutral wire and M-phases, M being greater than or equal to 3.

3. The method as recited in claim 1, wherein generating a neutral-phase reference waveform comprises generating phase reference waveforms for each phase of the inverter.

4. The method as recited in claim 1, wherein generating a neutral-phase reference waveform comprises generating the neutral-phase reference waveform using a pulse-density modulation technique.

5. The method as recited in claim 1, wherein generating a neutral-phase midpoint compensation waveform comprises generating a phase midpoint compensation waveform for each phase of the inverter.

6. The method as recited in claim 1, wherein generating a neutral-phase compensated duty cycle waveform comprises generating a phase compensated duty cycle waveform for each phase of the inverter.

7. The method as recited in claim 1, wherein generating a neutral-phase compensated duty cycle waveform comprises subtracting one-half the neutral-phase reference waveform from a minimum of 0 and the neutral-phase reference waveform.

8. The method as recited in claim 1, wherein generating a neutral-phase compensated duty cycle waveform comprises adding one-half the neutral-phase reference waveform to a maximum of 0 and the neutral-phase reference waveform.

9. The method as recited in claim 1, wherein generating neutral-phase switch command signals for switches of a neutral-phase of the inverter comprises generating phase switch command signals for switches of each phase of the inverter using a phase compensated duty cycle waveform for each phase of the inverter.

10. The method as recited in claim 1, further comprising connecting each phase of the inverter to a midpoint rail for equivalent periods of time during switching cycles of the inverter.

11. The method as recited claim 1, further comprising:
receiving direct current (DC) at the inverter; and
inverting the DC power into alternating current (AC) power using the neutral-phase switch command signals.

12. A multilevel inverter, comprising:
a neutral-phase with a plurality of switches;
a direct current (DC) midpoint rail connected to the switches; and
a controller operatively connected to the plurality of switches and disposed in communication with a memory having instructions recorded thereon that, when read by the controller cause the controller to:
generate a neutral-phase reference waveform;
generate a neutral-phase midpoint compensation waveform using the neutral-phase reference waveform;
generate a neutral-phase compensated duty cycle waveform using the neutral-phase midpoint compensation waveform; and
generate neutral-phase switch command signals for switches of a neutral-phase of the inverter using the neutral-phase compensated duty cycle waveform.

13. The inverter as recited in claim 12, wherein the inverter has a neutral wire and M-phases, M being greater than or equal to 3, and wherein the instructions further cause the controller to:
generate phase reference waveforms for each phase of the inverter;
generate a phase midpoint compensation waveform for each phase of the inverter using the phase reference waveforms;
generate a phase compensated duty cycle waveform for each phase of the inverter using the phase midpoint compensation waveforms; and
generate phase switch command signals for switches of each phase of the inverter using a phase compensated duty cycle waveform for each phase of the inverter.

14. The inverter as recited in claim 12, wherein the inverter has a neutral wire and M-phases, M being greater than or equal to 3, and wherein the instructions further cause the controller to connect each phase of the inverter to a midpoint rail for equivalent periods of time during switching cycles of the inverter phases.

15. The inverter as recited in claim 12, further comprising a multilevel DC link connected to the inverter.

16. The inverter as recited in claim 12, further comprising a rectifier connected to the inverter.

17. The inverter as recited in claim 16, further comprising a variable frequency AC power source connected to the inverter by the rectifier.

18. The inverter as recited in claim 16, further comprising an AC bus connected to the inverter, the AC bus comprising an A-phase lead, a B-phase lead, a C-phase lead, and a neutral-phase lead.

19. A computer program product tangibly embodied on a computer readable medium, the computer program product including instructions that, when executed by a processor, cause the processor to perform operations comprising:
generating a neutral-phase reference waveform;
generating a neutral-phase midpoint compensation waveform using the neutral-phase reference waveform;
generating a neutral-phase compensated duty cycle waveform using the neutral-phase midpoint compensation waveform; and
generating neutral-phase switch command signals for switches of a neutral-phase of the inverter using the neutral-phase compensated duty cycle waveform.

20. The computer program product of claim 19, wherein the instructions cause the processor to further perform the operation:
connecting each phase of the inverter to a midpoint rail for equivalent periods of time during switching cycles of the inverter phases.

* * * * *